US012563246B2

(12) United States Patent
Zhang et al.

(10) Patent No.: US 12,563,246 B2
(45) Date of Patent: Feb. 24, 2026

(54) METHOD, APPARATUS, ELECTRONIC DEVICE AND STORAGE MEDIUM FOR AUDIO AND VIDEO SYNCHRONIZATION MONITORING

(71) Applicant: BEIJING BYTEDANCE NETWORK TECHNOLOGY CO., LTD., Beijing (CN)

(72) Inventors: Wei Zhang, Beijing (CN); Xianhua Zeng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 104 days.

(21) Appl. No.: 18/572,317

(22) PCT Filed: Sep. 16, 2022

(86) PCT No.: PCT/CN2022/119419
§ 371 (c)(1),
(2) Date: Dec. 20, 2023

(87) PCT Pub. No.: WO2023/071598
PCT Pub. Date: May 4, 2023

(65) Prior Publication Data
US 2024/0292044 A1     Aug. 29, 2024

(30) Foreign Application Priority Data

Oct. 25, 2021    (CN) .......................... 202111241413.5

(51) Int. Cl.
H04N 21/24 (2011.01)
H04N 21/235 (2011.01)

(52) U.S. Cl.
CPC ....... H04N 21/2407 (2013.01); H04N 21/235 (2013.01)

(58) Field of Classification Search
CPC ............. H04N 21/2407; H04N 21/235; H04N 21/43072; H04N 21/8547; H04N 21/435; H04N 21/439; H04N 21/44
See application file for complete search history.

(56) References Cited

U.S. PATENT DOCUMENTS

| | | | | |
|---|---|---|---|---|
| 6,642,966 B1 * | 11/2003 | Limaye | ............ | H04N 21/23892 |
| | | | | 348/460 |
| 2006/0272000 A1 * | 11/2006 | Kwak | ................ | H04N 21/4884 |
| | | | | 715/255 |

(Continued)

FOREIGN PATENT DOCUMENTS

| | | |
|---|---|---|
| CN | 103167320 A | 6/2013 |
| CN | 104410894 A | 3/2015 |

(Continued)

OTHER PUBLICATIONS

English translation version of CN 112291498 B Nov. 4, 2022 (Year: 2022).*

(Continued)

*Primary Examiner* — Gigi L Dubasky
(74) *Attorney, Agent, or Firm* — Astute IP Law Group

(57) ABSTRACT

The disclosure discloses a method, apparatus, electronic device, and storage medium for audio and video synchronization monitoring, wherein the method is applied to a data push streaming end includes: collecting audio data and video data to be pushed for streaming, and encoding the audio data and video data; selecting a video reference frame from the video data and adding supplemental enhancement information during an encoding process of the video reference frame, wherein the supplemental enhancement information comprises reference information for synchronized playback of the audio data and video data; and pushing the encoded audio data and video data into a target content distribution network for the data pull streaming end pulls the audio data (Continued)

and video data by a third-party server, and monitoring the audio data and the video data based on the additional enhancement information to achieve the synchronized playback.

9 Claims, 2 Drawing Sheets

(56) References Cited

U.S. PATENT DOCUMENTS

| | | | |
|---|---|---|---|
| 2008/0170564 A1* | 7/2008 | Shi | H04N 19/68 |
| | | | 370/386 |
| 2015/0062353 A1* | 3/2015 | Dalal | H04N 21/4394 |
| | | | 348/515 |
| 2015/0350716 A1* | 12/2015 | Kruglick | H04N 21/816 |
| | | | 386/241 |
| 2017/0111680 A1 | 4/2017 | Schneider et al. | |
| 2018/0227164 A1 | 8/2018 | Wu et al. | |
| 2020/0322670 A1 | 10/2020 | Zhang et al. | |
| 2020/0336781 A1 | 10/2020 | Ramaswamy | |

FOREIGN PATENT DOCUMENTS

| | | | | | |
|---|---|---|---|---|---|
| CN | 109218794 A | | 1/2019 | | |
| CN | 109660843 A | | 4/2019 | | |
| CN | 110062277 A | | 7/2019 | | |
| CN | 110234028 A | | 9/2019 | | |
| CN | 110753202 A | | 2/2020 | | |
| CN | 111294634 A | | 6/2020 | | |
| CN | 111464256 A | | 7/2020 | | |
| CN | 111654736 A | | 9/2020 | | |
| CN | 112272327 A | | 1/2021 | | |
| CN | 112291498 A | | 1/2021 | | |
| CN | 112291498 B | * | 11/2022 | ............ | H04L 69/16 |
| JP | 2010-252151 A | | 11/2010 | | |
| WO | 2017107516 A1 | | 6/2017 | | |
| WO | 2020/056877 A1 | | 3/2020 | | |

OTHER PUBLICATIONS

Chinese Office Action, issued in Chinese patent application No. 202111241413.5, dated Feb. 2, 2024, 15 pages (translation enclosed).
International Search Report (with English translation) and Written Opinion issued in PCT/CN2022/119419, dated Nov. 28, 2022, 11 pages provided.

* cited by examiner

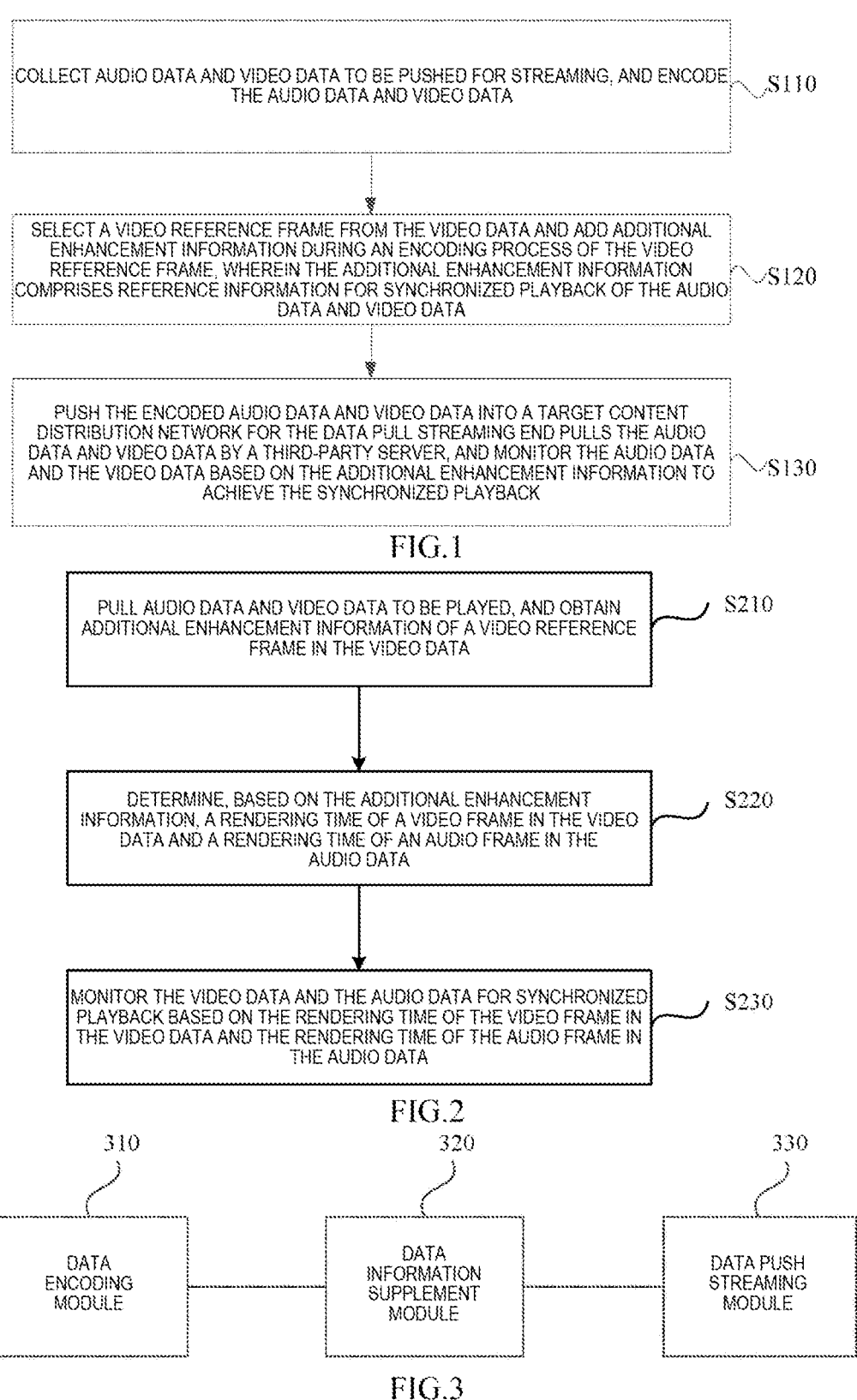

COLLECT AUDIO DATA AND VIDEO DATA TO BE PUSHED FOR STREAMING, AND ENCODE THE AUDIO DATA AND VIDEO DATA ⎯ S110

SELECT A VIDEO REFERENCE FRAME FROM THE VIDEO DATA AND ADD ADDITIONAL ENHANCEMENT INFORMATION DURING AN ENCODING PROCESS OF THE VIDEO REFERENCE FRAME, WHEREIN THE ADDITIONAL ENHANCEMENT INFORMATION COMPRISES REFERENCE INFORMATION FOR SYNCHRONIZED PLAYBACK OF THE AUDIO DATA AND VIDEO DATA ⎯ S120

PUSH THE ENCODED AUDIO DATA AND VIDEO DATA INTO A TARGET CONTENT DISTRIBUTION NETWORK FOR THE DATA PULL STREAMING END PULLS THE AUDIO DATA AND VIDEO DATA BY A THIRD-PARTY SERVER, AND MONITOR THE AUDIO DATA AND THE VIDEO DATA BASED ON THE ADDITIONAL ENHANCEMENT INFORMATION TO ACHIEVE THE SYNCHRONIZED PLAYBACK ⎯ S130

FIG.1

PULL AUDIO DATA AND VIDEO DATA TO BE PLAYED, AND OBTAIN ADDITIONAL ENHANCEMENT INFORMATION OF A VIDEO REFERENCE FRAME IN THE VIDEO DATA ⎯ S210

DETERMINE, BASED ON THE ADDITIONAL ENHANCEMENT INFORMATION, A RENDERING TIME OF A VIDEO FRAME IN THE VIDEO DATA AND A RENDERING TIME OF AN AUDIO FRAME IN THE AUDIO DATA ⎯ S220

MONITOR THE VIDEO DATA AND THE AUDIO DATA FOR SYNCHRONIZED PLAYBACK BASED ON THE RENDERING TIME OF THE VIDEO FRAME IN THE VIDEO DATA AND THE RENDERING TIME OF THE AUDIO FRAME IN THE AUDIO DATA ⎯ S230

DATA ENCODING MODULE — DATA INFORMATION SUPPLEMENT MODULE — DATA PUSH STREAMING MODULE

FIG.3

METHOD, APPARATUS, ELECTRONIC DEVICE AND STORAGE MEDIUM FOR AUDIO AND VIDEO SYNCHRONIZATION MONITORING

CROSS REFERENCE

This application claims priority to Chinese Patent Application No. 202111241413.5, filed on Oct. 25, 2021, and the entire contents of which are incorporated herein by reference in its entirety.

FIELD

Embodiments of the present disclosure relate to the field of computer technologies, and for example, relate to a method, apparatus, electronic device and storage medium for audio and video synchronization monitoring.

BACKGROUND

In the live stream process, real-time communication technology is usually used to reduce latency, the anchor data pull streaming end serves as an audio and video data push streaming end to push audio and video data to the content delivery network. The live stream audience data pull streaming end serves as an audio and video data pull streaming end, using a third-party server serve as an intermediary to request audio and video data from the content delivery network, and then the pulled audio and video data is decoded and played.

Among them, the synchronous monitoring of audio and video by the pull streaming end is based on the sender message issued by the third-party server when forwarding video data, as well as the timestamp typed on the audio and video data packet. This requires close cooperation between the pull streaming end and the third-party server, which has a high docking cost. Moreover, the third-party server as a third-party server other than the push streaming end and the pull streaming end, once there is a problem with the sender message or real-time communication data timestamp, it will cause the audio and video data played by the pull streaming end cannot be kept in synchronized, which affects the effect of the audio and video playback.

SUMMARY

Embodiments of the present disclosure provide a method, apparatus, electronic device and storage medium for audio and video synchronization monitoring, which can enable the push streaming end and pull streaming end to no longer rely on time information provided by a third party for audio and video data synchronization, and improve the security of data synchronization at the pull streaming end.

In a first aspect, embodiments of the present disclosure provide a method for audio and video synchronization monitoring, wherein the method is applied to a data push streaming end, the method comprises:

collecting audio data and video data to be pushed for streaming, and encoding the audio data and video data;

selecting a video reference frame from the video data and adding supplemental enhancement information during an encoding process of the video reference frame, wherein the supplemental enhancement information comprises reference information for synchronized playback of the audio data and video data;

pushing the encoded audio data and video data into a target content delivery network for the data pull streaming end pulls the audio data and video data by a third-party server, and monitoring the audio data and the video data based on the supplemental enhancement information to achieve the synchronized playback.

In a second aspect, embodiments of the present disclosure provide a method for audio and video synchronization monitoring, wherein the method is applied to a data pull streaming end, the method comprises:

pulling audio data and video data to be played, and obtaining supplemental enhancement information of a video reference frame in the video data;

determining, based on the supplemental enhancement information, a rendering time of a video frame in the video data and a rendering time of an audio frame in the audio data; and monitoring the video data and the audio data for synchronized playback based on the rendering time of the video frame in the video data and the rendering time of the audio frame in the audio data.

In a third aspect, embodiments of the present disclosure further provide an apparatus for audio and video synchronization monitoring, wherein the apparatus is configured at the data push streaming end, the apparatus comprises:

a data encoding module configured to collect audio data and video data to be pushed for streaming, and encode the audio data and video data;

a data information supplement module configured to select a video reference frame from the video data and add supplemental enhancement information during an encoding process of the video reference frame, wherein the supplemental enhancement information comprises reference information for synchronized playback of the audio data and video data; and a data push streaming module configured to push the encoded audio data and video data into a target content delivery network for the data pull streaming end pulls the audio data and video data by a third-party server, and monitor the audio data and the video data based on the supplemental enhancement information to achieve the synchronized playback.

In a fourth aspect, embodiments of the present disclosure further provide an apparatus for audio and video synchronization monitoring, wherein the apparatus is configured at the data pull streaming end, the apparatus comprises:

a data pulling module configured to pull audio data and video data to be played, and obtain supplemental enhancement information of a video reference frames in the video data;

a data rendering time determination module configured to determine, based on the supplemental enhancement information, a rendering time of a video frame in the video data and a rendering time of an audio frame in the audio data; and a data synchronization monitoring module configured to monitor the video data and the audio data for synchronized playback based on the rendering time of the video frame in the video data and the rendering time of the audio frame in the audio data.

In a fifth aspect, embodiments of the present disclosure further provide an electronic device, the electronic device comprising:

one or more processors;

a storage device configured to store one or more programs, the one or more programs, when executed by the one or more processors, causing the one or more processors to implement the method of audio and video synchronization monitoring which is applied to a data push streaming end or a data pull streaming end according to any of the embodiments of the present disclosure.

In a sixth aspect, embodiments of the present disclosure further provide a storage medium comprising computer executable instructions, the computer executable instructions, when executed by a computer processor, configured to implement the method of audio and video synchronization monitoring which is applied to a data push streaming end or a data pull streaming end according to any of the embodiments of the present disclosure.

BRIEF DESCRIPTION OF THE DRAWINGS

Throughout the drawings, the same or similar reference numerals indicate the same or similar elements. It should be understood that the drawings are illustrative and the originals and elements are not necessarily drawn to scale.

FIG. 1 is a schematic flowchart of a method for audio and video synchronization monitoring applied to a data push streaming end according to an embodiment of the present disclosure;

FIG. 2 is a schematic flowchart of a method for audio and video synchronization monitoring applied to a data pull streaming end according to another embodiment of the present disclosure;

FIG. 3 is a schematic structural diagram of an apparatus for audio and video synchronization monitoring configured at a data push streaming end according to an embodiment of the present disclosure;

DETAILED DESCRIPTION

Figures 4, 5:
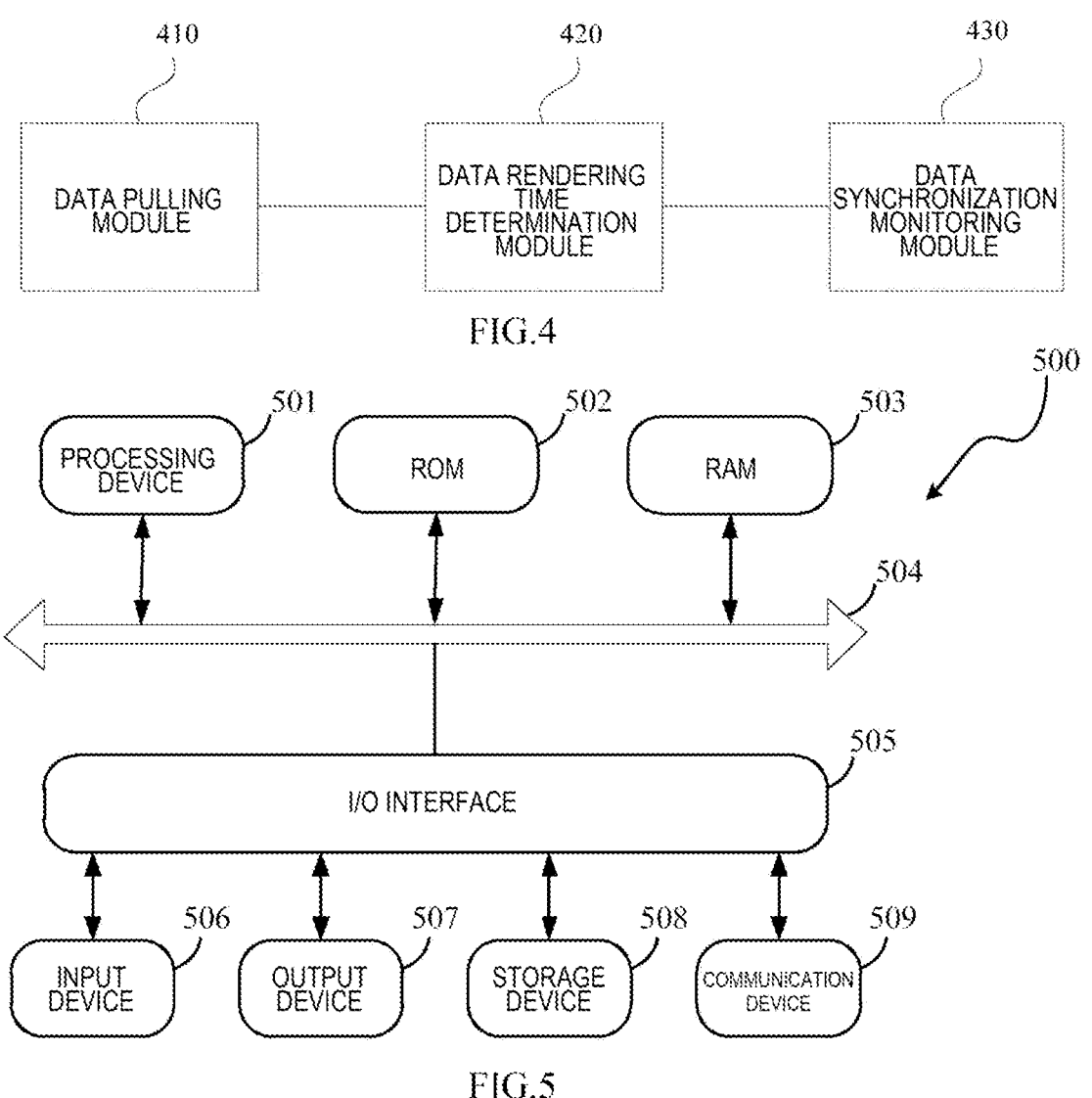
FIG. 4 is a schematic structural diagram of an apparatus for audio and video synchronization monitoring configured at a data pull streaming end according to another embodiment of the present disclosure.
FIG. 5 is a schematic structural diagram of an electronic device according to an embodiment of the present disclosure.

It should be understood that the steps described in the method embodiments of the present disclosure may be performed in a different order and/or in parallel. Furthermore, the method embodiments may include additional steps and/or omit to perform the illustrated steps. The scope of the present disclosure is not limited in this regard.

As used herein, the term "include" and its variants should be construed as open terms meaning "including, but not limited to". The term "based on" means "at least partially based on". The term "one embodiment" means "at least one embodiment". The term "another embodiment" means "at least one another embodiment". The terms "some embodiments" means "at least some embodiments". Related definitions of other terms will be given in the following descriptions.

It should be noted that the concepts of "first", "second" and the like mentioned in the present disclosure are used only to distinguish different apparatuses, modules or units but not to limit the order or interdependence of the functions performed by these apparatuses, modules or units.

It should be noted that the modifications of "a" and "a plurality" mentioned in the present disclosure are schematic rather than limiting, and it should be understood by those skilled in the art that unless otherwise explicitly stated in the context, they should be understood as "at least one".

FIG. 1 is a schematic flowchart of a method for audio and video synchronization monitoring applied to a data push streaming end according to an embodiment of the present disclosure. The embodiments of the present disclosure are applicable to cases where audio data and video data are synchronously played in a live stream process. The method can be performed by an apparatus for audio and video synchronization monitoring configured at the data push streaming end, which can be implemented in the form of software and/or hardware, which can be configured in an electronic device, such as in a server device.

As shown in FIG. 1, embodiments of the present disclosure provide a method for audio and video synchronization monitoring, wherein the method is applied to a data push streaming end comprises:

S110, collecting audio data and video data to be pushed for streaming, and encoding the audio data and video data.

The data push streaming end is the data sender in real-time data interaction, which can be the live client used by the anchor in live stream or the conference client of the speaker in real-time online conference. The data to be pushed is the video data and audio data captured by the data streaming end through the camera and microphone of the terminal device in which the data streaming end is located. The data push streaming is the process of encoding and packaging the captured audio data and video data, and then transmitting the packetized data packets to the target server based on the real-time communication transmission protocol. The target server is the service node of the content delivery network.

After the audio data and video data are captured at the data push streaming end, the data is encoded and packaged. Video encoding refers to the conversion of a certain video format file into another video format file through specific compression techniques. Commonly used encoding formats for video streaming include H.261, H.263, H.264, M-JPEG, and MPEG. For any of these video encoding formats, an encoded image can be considered a video frame. While the audio frame will be different due to the different encoding formats, the audio frame is related to the audio encoding format, which is the realization of the audio data frame under a plurality of encoding standards, and the different encoding formats have different parameters such as audio frame length and sampling rate.

S120, selecting a video reference frame from the video data and adding supplemental enhancement information during an encoding process of the video reference frame.

The video data usually contains a plurality of video frames, and the video reference frame is equivalent to a calibration point of other video frames. The rendering time of each frame can be determined concerning the rendering time of the video reference frame.

During the packaging of video data, supplemental enhancement information (SEI) can be added to the video stream after video encoding by attaching enhancement information. In this embodiment, the supplemental enhancement information includes reference information for synchronized playback of audio data and video data.

For example, in this embodiment, only a few video frames are selected as video reference frames in the video data. The data pull streaming end can determine the video reference frame containing supplemental enhancement information based on the pulled video data. Still it cannot confirm the audio reference frame corresponding to the video reference frame. Therefore, in the supplemental enhancement information, information related to the audio reference frame is set. The data pull streaming end selects the audio frame that is synchronized or close to the video reference frame in encoding time, determines it as the audio reference frame corresponding to the video reference frame, and uses the signature, audio frame length, audio data sampling rate, and audio frame rendering time of the audio frame as the content of the supplemental enhancement information to determine the rendering time of each audio frame. In addition, there is video data sampling rate, and video frame rendering time information for the video reference frame in the supplemental enhancement information for determining the other video frame rendering time.

For example, the video reference frame can be selected by selecting a video frame as a video reference frame at a predetermined time interval, for example, a video reference frame is selected every two seconds. Alternatively, a video reference frame can be selected at intervals of a certain number of video frames, for example, a video reference frame can be selected every 40 video frames.

S130, pushing the encoded audio data and video data into a target content delivery network for the data pull streaming end pulls the audio data and video data by a third-party server, and monitoring the audio data and the video data based on the additional enhancement information to achieve the synchronized playback.

For example, in the real-time data streaming communication process summarization, the data push streaming end will send the encoded audio data and video data in Flash Video (Flv) format to the target content delivery network (CDN). Then, the data pull streaming end will send a pull streaming request to the third-party server, which will perform pull streaming of audio data and video data to the target CDN based on the pull streaming address, and convert the pulled Flv format audio data and video data into data packets under the real-time Communication Protocol and send them to the pull streaming end. Therefore, the pull streaming end can obtain video data and audio data that need to be played synchronized. In the present embodiment, the pull streaming end can realize synchronized playback monitoring of audio data and video data based on the supplemental enhancement information of the video reference frame in the video data, realizing an end-to-end video and audio synchronization monitoring from the push streaming end to the pull streaming end. It no longer relies on the timestamp and sender message of the third-party server when sending data packets to the pull streaming end, thereby enhancing the security and reliability of video and audio synchronization monitoring.

Technical solution of an embodiment of the present disclosure, by collecting audio data and video data to be pushed stream, and in the process of encoding the audio data and video data, a video reference frame is selected, supplemental enhancement information is added in the video reference frame, as reference information for synchronized playback of the audio data and video data; and ultimately, the encoded audio data and video data is pushed to the target content delivery network, for the data pull streaming end to pull audio data and video data by the third-party server, and monitor the audio data and video data to realize synchronized playback based on the supplemental enhancement information in the video reference frame. The technical solution of the present disclosure avoids the data streaming end in the related technology to monitor the synchronization of audio and video data based on the messages and timestamp information of the third-party server other than the data push streaming end, and there is a high cost of data docking and low reliability; it realizes the ability to make the publish streaming end and the pull streaming end no longer rely on the information provided by the third-party server for audio and video data synchronization, and improves the security and reliability of the pull streaming end data synchronization.

Embodiments of the present disclosure provide a method for audio and video synchronization monitoring applied to a data pull streaming end, which belongs to the same concept as the method for audio and video synchronization monitoring applied to a data push streaming end provided in the above embodiments. The present embodiment describes the process of synchronized playback of the pulled audio and video data at the data pull streaming end. The method can be performed by an apparatus for audio and video synchronization monitoring configured at the data pull streaming end, which can be implemented in the form of software and/or hardware, which can be configured in an electronic device, such as in a server device.

FIG. 2 is a schematic flowchart of a method for audio and video synchronization monitoring applied to a data pull streaming end according to another embodiment of the present disclosure. As shown in FIG. 2, the present embodiment provides a method for audio and video synchronization monitoring, including:

S210, pulling audio data and video data to be played, and obtaining additional enhancement information of a video reference frame in the video data.

In low-latency live stream or other real-time data transmission scenarios, the data pull streaming end pulls audio and video data to be played in the content delivery network through a third-party server. In this embodiment, the pulled video data includes a video reference frame with supplemental enhancement information added. The additional reference information is information added to the video stream during data encoding at the data push streaming end. the supplemental enhancement information includes reference information for synchronized playback of the audio and video data to be played.

S220, determining, based on the additional enhancement information, a rendering time of a video frame in the video data and a rendering time of an audio frame in the audio data.

Since only the video data contains supplemental enhancement information, the video reference frame can be determined. First, the audio reference frame corresponding to the video reference frame is to be determined based on the supplemental enhancement information. Then, the rendering time of each video frame in the video data and the rendering time of each audio frame in the audio data are determined based on the relevant information of the video reference frame and the audio reference frame. Of course, after obtaining the supplemental enhancement information, the operation of determining the audio reference frame and determining the rendering time of each video frame can be performed synchronously. The determination process is as follows:

The video reference frame in the latest pulled-in video data is obtained as the latest video reference frame, the supplemental enhancement information of the video reference frame is the reference data for calculating the rendering time of the video frame and the audio frame that determine the current unknown rendering time.

One embodiment of determining the video frame rendering time of a video frame with a currently unknown rendering time is to calculate the first time difference between the sending timestamp of each video frame and the sending timestamp of the video reference frame for each video frame in the pulled video data, which is expressed by the formula:

$diff-$tsp1 (first time difference) $=$ $\qquad$ int64_t (rtp_timestamp of video frame) $-$ $\qquad\qquad$ int64_t (rtp_timestamp of video reference frame). rtp_timestamp is the timestamp of the third-party server when sending a real-time communication data packet, and the data type is a 64-bit unsigned integer, indicating the time when the sender report (SR) of the corresponding video frame is sent. Then, based on the first time difference and the video data sampling rate, the first rendering time difference between each video frame and the video reference frame is determined; the first rendering time difference is superimposed on the video frame rendering time of the video reference frame to determine the video frame rendering time of each video frame. It can be expressed as:

video rendering time of each video frame $=$ $$1000 * \frac{diff_{tsp1}}{\text{video data sampling rate}} +$$

$$\text{video rendering time of video reference frame.}$$

One embodiment of determining the audio frame render-ing time of an audio frame with a currently unknown rendering time is to first determine that the audio reference frame based on the audio reference frame signature and the audio frame length in the supplemental enhancement infor-mation and match the corresponding audio reference frame to the video reference frame. After the data pull streaming end pulls the audio data, the audio data will be decoded and temporarily stored in an audio buffer. After the supplemental enhancement information is obtained, the audio reference frame with the same signature and frame length can be matched in the audio buffer based on the signature and audio frame length of the audio reference frame as the latest reference frame used as a reference for the audio frame with an undetermined rendering time. Then, the audio data sam-pling rate and audio frame rendering time of the audio reference frame in the supplemental enhancement informa-tion, as well as the sending timestamp of each audio frame in the audio data, can be used to determine the audio frame rendering time of the corresponding audio frame in the audio data. For each audio frame in the audio data, calculating the second time difference between the sending timestamp of each audio frame and the sending timestamp of the audio reference frame; it can be expressed as:

$diff-$tsp2 (second time difference) $=$ $\qquad$ int64_t (rtp_timestamp of audio frame) $-$ $\qquad\qquad$ int64_t (rtp_timestamp of audio reference frame). rtp_timestamp is the timestamp of the third-party server when sending real-time communication data packets, and the data type is a 64-bit unsigned integer, indicating the time when the sender report (SR) of the corresponding audio frame is sent. For example, based on the second time difference and the audio data sampling rate, the second rendering time difference of each audio frame and the audio reference frame is determined, the second rendering time difference and the video frame rendering time of the audio reference frame are superimposed to determine the video frame rendering time of each audio frame.

The available formula can be expressed as:

video redering time of each audio frame $=$ $$1000 * \frac{diff_{tsp1}}{\text{audio data sampling rate}} +$$

$$\text{video rendering time of audio reference frame}$$

S230, monitoring the video data and the audio data for synchronized playback based on the rendering time of the video frame in the video data and the rendering time of the audio frame in the audio data.

In the process of audio and video synchronization, since human hearing is more sensitive than vision, the video is usually synchronized to the audio clock. The usual sense of audio and video synchronization is to allow a certain delay, that is, the delay should be within the acceptable delay range, which is equivalent to a feedback mechanism. when the video is slower than the audio to speed up the video playback speed, and vice versa, the video playback speed is reduced.

For example, the arrival time difference of video data relative to audio data can be determined by the video frame rendering time of the latest video frame in the pulled video data and the arrival timestamp of the data arriving at the data pull streaming end, as well as the audio frame rendering time and data arrival timestamp of the latest audio frame in the audio data. The formula can be expressed as: the arrival time difference of video relative to audio=(the rendering time of latest video frame–the arrival time of latest video frame)–(the rendering time of latest audio frame–the arrival time of latest audio frame). Then, based on the arrival time differ-ence of video relative to audio, the time difference of audio and video playback is updated to monitor video data and audio data for synchronized playback. Further, during con-tinuous audio and video playback, audio and video playback regulation according to real-time video frame rendering time and audio frame rendering time, the video delay with respect to the audio within a predetermined delay range.

Embodiments of the present disclosure, the real-time data interaction through the data pull streaming end, after pulling the audio data and video data, determining the video data and audio data in the video frame and the audio frame according to the supplemental enhancement information of the video reference frame rendering time, so as to monitor the audio data and video data synchronized playback accord-ing to the video frame and the audio frame rendering time, and based on the actual rendering time of the audio and video frame monitoring audio and video synchronization, without the use of third-party server audio and video data packet information. The technical solution of the present disclosure avoids the synchronization of audio and video data monitored by the data pull streaming end based on the packets and timestamp information of the third-party server outside the data push streaming end in the related art, and there is a high cost of data docking and low reliability; it realizes the ability to make the publish streaming end and the pull streaming end no longer rely on the information pro-vided by the third-party server for audio and video data synchronization, and improves the security and reliability of the pull streaming end data synchronization.

FIG. 3 is a schematic structural diagram of an apparatus for audio and video synchronization monitoring configured at a data push streaming end according to an embodiment of the present disclosure. The apparatus for audio and video synchronization monitoring configured at the data push streaming end provided by the present embodiment is applicable to the situation of synchronized playback of audio data and video data during the live stream process.

As shown in FIG. 3, configured in the data push streaming end apparatus for audio and video synchronization monitoring including: a data encoding module 310, data information supplement module 320 and data push streaming module 330.

Herein the data encoding module 310 is configured to collect audio data and video data to be pushed for streaming, and encode the audio data and video data; the data information supplement module 320 is configured to select a video reference frame from the video data and add additional enhancement information during an encoding process of the video reference frame, wherein the additional enhancement information comprises reference information for synchronized playback of the audio data and video data; the data push streaming module 330 is configured to push the encoded audio data and video data into a target content delivery network for the data pull streaming end and pulls the audio data and video data by a third-party server, and monitor the audio data and the video data based on the additional enhancement information to achieve the synchronized playback.

The technical solution of an embodiments of the present disclosure, by collecting to be pushed for streaming audio data and video data, and in the process of encoding the audio data and video data, a video reference frame is selected, supplemental enhancement information is added in the video reference frame, as the audio data and video data synchronized playback reference information; finally, the encoded audio data and video data is pushed to the target content delivery network for the data pull streaming end pulls the audio data and video data by a third-party server, and monitor the audio data and the video data based on the supplemental enhancement information to achieve the synchronized playback. The technical solution of the present disclosure avoids the synchronization of audio and video data monitored by the data pull streaming end based on the packets and timestamp information of the third-party server outside the data push streaming end in the related art, and there is a high cost of data docking and low reliability; it realizes the ability to make the publish streaming end and the pull streaming end no longer rely on the information provided by the third-party server for audio and video data synchronization, and improves the security and reliability of the pull streaming end data synchronization.

For example, the data information supplement module 320 is configured for:

determining an audio reference frame corresponding to the video reference frame; and adding, as the supplemental enhancement information, a signature of the audio reference frame, an audio frame length, an audio data sampling rate and audio frame rendering time, a video data sampling rate of the video reference frame, and a video frame rendering time into encoded data of the reference video frame.

Embodiments of the present disclosure is configured for provide a data push streaming end apparatus for audio and video synchronization monitoring, the present disclosure may be applied to any embodiment of the data provided push streaming end method for audio and video synchronization monitoring, including execution method corresponding functional modules and beneficial effects.

It is noted that the plurality of units and modules included in the above device are only divided in accordance with the functional logic, but are not limited to the above division, as long as they are capable of realizing the corresponding functions; furthermore, the specific names of the plurality of functional units are only for the purpose of facilitating the differentiation from each other, and are not used to limit the scope of protection of the embodiments of the present disclosure.

FIG. 4 is a schematic structural diagram of an apparatus for audio and video synchronization monitoring configured at a data pull streaming end according to another embodiment of the present disclosure. The apparatus for audio and video synchronization monitoring configured at the data pull streaming end provided by the present embodiment is applicable to the process of synchronized playback of the pulled audio data and video data at the data pull streaming end.

As shown in FIG. 4, the apparatus for audio and video synchronization monitoring configured at the data pull streaming end comprising: a data pulling module 410, data rendering time determination module 420 and data synchronization monitoring module 430.

Herein the data pulling module 410 is configured to pull audio data and video data to be played, and obtain supplemental enhancement information of a video reference frames in the video data; the data rendering time determination module 420 is configured to determine, based on the supplemental enhancement information, a rendering time of a video frame in the video data and a rendering time of an audio frame in the audio data; the data synchronization monitoring module 430 is configured to monitor the video data and the audio data for synchronized playback based on the rendering time of the video frame in the video data and the rendering time of the audio frame in the audio data.

Embodiments of the present disclosure, the real-time data interaction through the data pull streaming end, after pulling the audio data and video data, determining the video data and audio data in the video frame and the audio frame according to the supplemental enhancement information of the video reference frame rendering time, so as to monitor the audio data and video data synchronized playback according to the video frame and the audio frame rendering time, and based on the actual rendering time of the audio and video frame monitoring audio and video synchronization, without the use of third-party server audio and video data packet information. The technical solution of the present disclosure avoids the synchronization of audio and video data monitored by the data pull streaming end based on the packets and timestamp information of the third-party server outside the data push streaming end in the related art, and there is a high cost of data docking and low reliability; it realizes the ability to make the publish streaming end and the pull streaming end no longer rely on the information provided by the third-party server for audio and video data synchronization, and improves the security and reliability of the pull streaming end data synchronization.

For example, the data rendering time determination module 420 includes: an audio reference frame determination sub-module, an audio frame rendering time determination sub-module and a video frame rendering time determination sub-module.

Herein the audio reference frame determination sub-module is configured for: determining a corresponding audio reference frame that matches the video reference frame based on an audio reference frame signature and an audio frame length in the supplemental enhancement information.

The audio frame rendering time determination sub-module is configured for: determining an audio frame rendering time of each audio frame in the audio data based on an audio data sampling rate and an audio frame rendering time of the audio reference frame in the supplemental enhancement information, and a sending timestamp of each audio frame in the audio data.

The video frame rendering time determination sub-module is configured for: determining a video frame rendering time of each video frame in the video data based on a video data sampling rate and a video frame rendering time of the video reference frame in the supplemental enhancement information, and a sending timestamp of each video frame in the video data.

For example, the video frame rendering time determination sub-module is configured for:

calculating, for each video frame in the video data, a first time difference between a sending timestamp of the each video frame and the video reference frame;

determining a first rendering time difference between the each video frame and the video reference frame based on the first time difference and the video data sampling rate; and determining the video frame rendering time of each video frame by adding the first rendering time difference and the video frame rendering time of the video reference frame.

For example, the video frame rendering time determination sub-module is configured for:

calculating, for each audio frame in the audio data, a second time difference between a sending timestamp of the each audio frame and the audio reference frame;

determining a second rendering time difference between the each audio frame and the audio reference frame based on the second time difference and the audio data sampling rate; and determining the video frame rendering time of the each audio frame by adding the second rendering time difference and the video frame rendering time of the audio reference frame.

For example, the data synchronization monitoring module 430 is configured for:

determining an arrival time difference of the video data relative to the audio data based on a video rendering time of a latest video frame in the video data and an arrival timestamp of the video data, and an audio frame rendering time of a latest audio frame in the audio data and an arrival timestamp of the audio data; and monitoring the video data and the audio data for synchronized playback based on the arrival time difference.

The apparatus for the audio and video synchronization monitoring configured to be used at the data pull streaming end provided in the embodiments of the present disclosure can perform the method for audio and video synchronization monitoring applied to the data pull streaming end provided in any embodiment of the present disclosure, with the functional modules and beneficial effects corresponding to the performance of the method.

It is noted that the plurality of units and modules included in the above device are only divided in accordance with the functional logic, but are not limited to the above division, as long as they are capable of realizing the corresponding functions; furthermore, the specific names of the plurality of functional units are only for the purpose of facilitating the differentiation from each other, and are not used to limit the scope of protection of the embodiments of the present disclosure.

Reference is made below to FIG. 5, which illustrates a schematic structural diagram of an electronic device (e.g., terminal device or server in FIG. 5) 500 suitable for implementing embodiments of the present disclosure. Terminal device in embodiments of the present disclosure may include, but are not limited to, mobile terminals such as cell phones, notebook computers, digital broadcast receivers, PDAs (personal digital assistants), PADs (tablet computers), PMPs (portable multimedia players), car terminals (e.g., car navigation terminals) and the like, as well as fixed terminals such as digital TVs, desktop computers and the like. The electronic device illustrated in FIG. 5 is merely an example and should not impose any limitation on the functions and scope of use of the embodiments of the present disclosure.

As shown in FIG. 5, the electronic device 500 may include a processing device (e.g., a central processor, graphics processor, etc.) 501, which can perform a plurality of appropriate actions and processes based on programs stored in Read-Only Memory (ROM) 502 or loaded from storage device 506 into Random Access Memory (RAM) 503. Also stored in the RAM 503 are a plurality of programs and data required for operation of the electronic device 500. The processing device 501, ROM 502, and RAM 503 are connected to each other through bus 504. Input/output (I/O) interface 505 is also connected to bus 504.

Typically, the following devices can be connected to I/O interface 505: input devices 506 including, for example, touch screens, touchpads, keyboards, mice, cameras, microphones, accelerometers, gyroscopes, etc.; output devices 507 including, for example, liquid crystal displays (LCDs), speakers, vibrators, etc.; storage devices 508 including, for example, magnetic tapes, hard disks, etc.; and communication devices 509. The communication devices 509 can allow electronic devices 500 to communicate wirelessly or wirelessly with other devices to exchange data. Although FIG. 5 shows an electronic device 500 with a variety of devices, it should be understood that it is not required to implement or have all the devices shown. More or fewer devices may alternatively be implemented or possessed.

According to embodiments of the present disclosure, the process described above with reference to the flowchart can be implemented as a computer software program. For example, embodiments of the present disclosure include a computer program product that includes a computer program carried on a non-transitory computer-readable medium, the computer program containing program code for performing the method shown in the flowchart. In such embodiments, the computer program can be downloaded and installed from the network through the communication device 509, or from the storage device 506, or from the ROM 502. When the computer program is executed by the processing device 501, the above functions defined in the method for audio and video synchronization monitoring for push data streaming end or data pull streaming end of the present disclosure are performed.

The electronic device provided by the embodiments of the present disclosure belongs to the same disclosure concept as the method for audio and video synchronization monitoring applied to the data push streaming end or the data pull streaming end provided by the embodiments described above, technical details not exhaustively described in the present embodiments can be found in the embodiments described above, and the present embodiments and the embodiments described above have the same beneficial effects.

Embodiments of the present disclosure provide a computer storage medium having stored thereon a computer program, when executed by a processor, implements the method of audio and video synchronization monitoring applied to a data pull streaming end or a data push streaming end as provided in the above embodiment.

It should be noted that the computer-readable medium described above can be a computer-readable signal medium, a computer-readable storage medium, or any combination thereof. The computer-readable storage medium can be, but is not limited to, an electrical, magnetic, optical, electro-magnetic, infrared, or semiconductor system, device, or any combination thereof. More specific examples of computer-readable storage media can include but are not limited to: electrical connections with one or more wires, portable computer disks, hard disks, random access memory (RAM), read-only memory (ROM), erasable programmable read-only memory (EPROM) or flash memory (FLASH), optical fibers, portable compact disk read-only memory (CD-ROM), optical storage devices, magnetic storage devices, or any suitable combination thereof. In this disclosure, the computer-readable storage medium can be any tangible medium containing or storing a program that can be used by an instruction execution system, device, or device, or in combination with it. In this disclosure, a computer-readable signal medium can include a data signal propagated in baseband or as part of a carrier wave, which carries computer-readable program code. Such propagated data signals can take various forms, including but not limited to electromagnetic signals, optical signals, or any suitable combination thereof. The computer-readable signal medium can also be any computer-readable medium other than a computer-readable storage medium, which can send, propagate, or transmit programs for use by or in combination with instruction execution systems, devices, or devices. The program code contained on the computer-readable medium can be transmitted using any suitable medium, including but not limited to: wires, optical cables, RF (radio frequency), etc., or any suitable combination thereof.

In some implementation methods, clients and servers can communicate utilizing any currently known or future developed network protocol such as HyperText Transfer Protocol (HTTP), and can interconnect with any form or medium of digital data communication (e.g., communication networks). Examples of communication networks include local area networks (LANs), wide area networks (WANs), the Internet (such as the Internet), and end-to-end networks (such as ad hoc end-to-end networks), as well as any currently known or future developed networks.

The computer-readable medium may be included in the above electronic device; or it may exist separately and not be assembled into said electronic device.

The computer-readable medium carries one or more programs, when executed by the electronic device, cause the electronic device for:

collecting audio data and video data to be pushed for streaming, and encoding the audio data and video data;

selecting a video reference frame from the video data and adding supplemental enhancement information during an encoding process of the video reference frame, wherein the supplemental enhancement information comprises reference information for synchronized playback of the audio data and video data; and pushing the encoded audio data and video data into a target content distribution network for the data pull streaming end pulls the audio data and video data by a third-party server, and monitoring the audio data and the video data based on the additional enhancement information to achieve the synchronized playback.

The computer-readable medium carries one or more programs, when executed by the electronic device, further cause the electronic device for:

pulling audio data and video data to be played, and obtaining supplemental enhancement information of a video reference frame in the video data;

determining, based on the supplemental enhancement information, a rendering time of a video frame in the video data and a rendering time of an audio frame in the audio data; and monitoring the video data and the audio data for synchronized playback based on the rendering time of the video frame in the video data and the rendering time of the audio frame in the audio data.

Computer program code for performing the operations of the present disclosure may be written in one or more programming languages, or combinations thereof, including but not limited to Object Oriented programming languages such as Java, Smalltalk, C++, and also including conventional procedural programming languages such as "C" or similar programming languages. The program code may be executed entirely on the user's computer, partially on the user's computer, as a standalone software package, partially on the user's computer, partially on a remote computer, or entirely on a remote computer or server. In the case of a remote computer, the remote computer may be connected to the user's computer through any type of network, including a local area network (LAN) or a wide area network (WAN), or may be connected to an external computer (e.g., using an Internet service provider to connect over the Internet).

The flowcharts and block diagrams in the accompanying drawings illustrate the architecture, functions, and operations of the systems, methods, and computer program products that may be implemented in accordance with various embodiments of the present disclosure. In this regard, each block in the flowcharts or block diagrams may represent a module, program segment, or portion of code that contains one or more executable instructions for implementing the specified logical functions. It should also be noted that in some alternative implementations, the functions marked in the blocks may also occur in a different order than those marked in the figures. For example, two consecutive blocks may actually be executed in substantially parallel, and they may sometimes be executed in the opposite order, depending on the functions involved. It should also be noted that each block in the block diagrams and/or flowcharts, as well as combinations of blocks in the block diagrams and/or flowcharts, may be implemented using a dedicated hardware-based system that performs the specified functions or operations, or may be implemented using a combination of dedicated hardware and computer instructions.

The units described in the embodiments of the present disclosure can be implemented by software or hardware. The names of units and modules do not limit the unit or module itself in some cases. For example, the data generation module can also be described as a "video data generation module".

The functions described above in this article can be at least partially performed by one or more hardware logic components. For example, without limitation, exemplary types of hardware logic components that can be used include: Field Programmable Gate Array (FPGA), Application Specific Integrated Circuit (ASIC), Application Specific Standard Parts (ASSP), System on Chip (SOC), Complex Programmable Logic Device (CPLD), etc.

In the context of this disclosure, a machine-readable medium can be a tangible medium that can contain or store programs for use by or in conjunction with an instruction execution system, device, or device. A machine-readable medium can be a machine-readable signal medium or a machine-readable storage medium. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, portable compact disc read-only memory (CD-ROM), optical storage devices, magnetic storage devices, or any suitable combination thereof.

According to one or more embodiments of the present disclosure, [Example 1] provides a method for audio and video synchronization monitoring applied to a data push streaming end, the method comprising:

collecting audio data and video data to be pushed for streaming, and encoding the audio data and video data;

selecting a video reference frame from the video data and adding supplemental enhancement information during an encoding process of the video reference frame, wherein the supplemental enhancement information comprises reference information for synchronized playback of the audio data and video data; and pushing the encoded audio data and video data into a target content distribution network for the data pull streaming end pulls the audio data and video data by a third-party server, and monitoring the audio data and the video data based on the additional enhancement information to achieve the synchronized playback.

According to one or more embodiments of the present disclosure, [Example 2] provides a method for audio and video synchronization monitoring applied to a data push streaming end, further comprising:

For example, the supplemental enhancement information is added in the encoding process of the video reference frame, comprising:

determining an audio reference frame corresponding to the video reference frame; and adding, as the supplemental enhancement information, a signature of the audio reference frame, an audio frame length, an audio data sampling rate and audio frame rendering time, a video data sampling rate of the video reference frame, and a video frame rendering time into encoded data of the reference video frame.

According to one or more embodiments of the present disclosure, [Example 3] provides a method for audio and video synchronization monitoring applied to a data pull streaming end, further comprising:

pulling audio data and video data to be played, and obtaining supplemental enhancement information of a video reference frame in the video data;

determining, based on the supplemental enhancement information, a rendering time of a video frame in the video data and a rendering time of an audio frame in the audio data; and monitoring the video data and the audio data for synchronized playback based on the rendering time of the video frame in the video data and the rendering time of the audio frame in the audio data.

According to one or more embodiments of the present disclosure, [Example 4] provides a method for audio and video synchronization monitoring applied to a data pull streaming end, further comprising:

For example, determining, based on the supplemental enhancement information, a rendering time of a video frame in the video data and a rendering time of an audio frame in the audio data, including:

determining a corresponding audio reference frame that matches the video reference frame based on an audio reference frame signature and an audio frame length in the supplemental enhancement information;

determining an audio frame rendering time of each audio frame in the audio data based on an audio data sampling rate and an audio frame rendering time of the audio reference frame in the supplemental enhancement information, and a sending timestamp of each audio frame in the audio data; and determining a video frame rendering time of each video frame in the video data based on a video data sampling rate and a video frame rendering time of the video reference frame in the supplemental enhancement information, and a sending timestamp of each video frame in the video data.

According to one or more embodiments of the present disclosure, [Example 5] provides a method for audio and video synchronization monitoring applied to a data pull streaming end, comprising:

the determining a video frame rendering time of each video frame in the video data based on a video data sampling rate and a video frame rendering time of the video reference frame in the supplemental enhancement information, and a sending timestamp of each video frame in the video data, including:

calculating, for each video frame in the video data, a first time difference between a sending timestamp of the each video frame and the video reference frame;

determining a first rendering time difference between the each video frame and the video reference frame based on the first time difference and the video data sampling rate; and determining the video frame rendering time of each video frame by adding the first rendering time difference and the video frame rendering time of the video reference frame.

According to one or more embodiments of the present disclosure, [Example 6] provides a method for audio and video synchronization monitoring applied to a data pull streaming end, further comprising:

For example, the determining an audio frame rendering time of each audio frame in the audio data based on an audio data sampling rate and an audio frame rendering time of the audio reference frame in the supplemental enhancement information, and a sending timestamp of each audio frame in the audio data, including:

calculating, for each audio frame in the audio data, a second time difference between a sending timestamp of the each audio frame and the audio reference frame;

determining a second rendering time difference between the each audio frame and the audio reference frame based on the second time difference and the audio data sampling rate; and determining the video frame rendering time of the each audio frame by adding the second rendering time difference and the video frame rendering time of the audio reference frame.

According to one or more embodiments of the present disclosure, [Example 7] provides a method for audio and video synchronization monitoring applied to a data pull streaming end, further comprising:

For example, the monitoring the video data and the audio data for synchronized playback based on the rendering time of the video frame in the video data and the rendering time of the audio frame in the audio data, including:

determining an arrival time difference of the video data relative to the audio data based on a video rendering time of a latest video frame in the video data and an arrival timestamp of the video data, and an audio frame rendering time of a latest audio frame in the audio data and an arrival timestamp of the audio data; and monitoring the video data and the audio data for synchronized playback based on the arrival time difference.

According to one or more embodiments of the present disclosure, [Example 8] provides an apparatus for audio and video synchronization monitoring configured at a data push streaming end, comprising:

a data encoding module configured to collect audio data and video data to be pushed for streaming, and encode the audio data and video data;

a data information supplement module configured to select a video reference frame from the video data and add supplemental enhancement information during an encoding process of the video reference frame, wherein the supplemental enhancement information comprises reference information for synchronized playback of the audio data and video data; and a data push streaming module configured to push the encoded audio data and video data into a target content delivery network for the data pull streaming end pulls the audio data and video data by a third-party server, and monitor the audio data and the video data based on the supplemental enhancement information to achieve the synchronized playback.

According to one or more embodiments of the present disclosure, [Example 9] provides an apparatus for audio and video synchronization monitoring configured at a data push streaming end, further comprising:

For example, the data information supplement module is configured for:

determining an audio reference frame corresponding to the video reference frame; and adding, as the supplemental enhancement information, a signature of the audio reference frame, an audio frame length, an audio data sampling rate and audio frame rendering time, a video data sampling rate of the video reference frame, and a video frame rendering time into encoded data of the reference video frame.

According to one or more embodiments of the present disclosure, [Example 10] provides an apparatus for audio and video synchronization monitoring configured at a data pull streaming end, further comprising:

a data pulling module configured to pull audio data and video data to be played, and obtain supplemental enhancement information of a video reference frames in the video data;

a data rendering time determination module configured to determine, based on the supplemental enhancement information, a rendering time of a video frame in the video data and a rendering time of an audio frame in the audio data; and a data synchronization monitoring module configured to monitor the video data and the audio data for synchronized playback based on the rendering time of the video frame in the video data and the rendering time of the audio frame in the audio data.

According to one or more embodiments of the present disclosure, [Example 11] provides an apparatus for audio and video synchronization monitoring configured at a data pull streaming end, further comprising:

For example, the data rendering time determination module includes: an audio reference frame determination sub-module, an audio frame rendering time determination sub-module, and a video frame rendering time determination sub-module.

Wherein the audio reference frame determination sub-module is configured for: determining a corresponding audio reference frame that matches the video reference frame based on an audio reference frame signature and an audio frame length in the supplemental enhancement information.

The audio frame rendering time determination sub-module is configured for: determining an audio frame rendering time of each audio frame in the audio data based on an audio data sampling rate and an audio frame rendering time of the audio reference frame in the supplemental enhancement information, and a sending timestamp of each audio frame in the audio data.

The video frame rendering time determination sub-module is configured for: determining a video frame rendering time of each video frame in the video data based on a video data sampling rate and a video frame rendering time of the video reference frame in the supplemental enhancement information, and a sending timestamp of each video frame in the video data.

According to one or more embodiments of the present disclosure, [Example 12] provides an apparatus for audio and video synchronization monitoring configured at a data pull streaming end, comprising:

For example, the video frame rendering time determination sub-module is configured for:

calculating, for each video frame in the video data, a first time difference between a sending timestamp of the each video frame and the video reference frame;

determining a first rendering time difference between the each video frame and the video reference frame based on the first time difference and the video data sampling rate; and determining the video frame rendering time of each video frame by adding the first rendering time difference and the video frame rendering time of the video reference frame.

According to one or more embodiments of the present disclosure, [Example 13] provides an apparatus for audio and video synchronization monitoring configured at a data pull streaming end, further comprising:

For example, the video frame rendering time determination sub-module is configured for:

calculating, for each audio frame in the audio data, a second time difference between a sending timestamp of the each audio frame and the audio reference frame;

determining a second rendering time difference between the each audio frame and the audio reference frame based on the second time difference and the audio data sampling rate; and determining the video frame rendering time of the each audio frame by adding the second rendering time difference and the video frame rendering time of the audio reference frame.

According to one or more embodiments of the present disclosure, [Example 14] provides an apparatus for audio and video synchronization monitoring configured at a data pull streaming end, further comprising:

For example, the data synchronization monitoring module is configured for:

determining an arrival time difference of the video data relative to the audio data based on a video rendering time of a latest video frame in the video data and an arrival timestamp of the video data, and an audio frame rendering time of a latest audio frame in the audio data and an arrival timestamp of the audio data; and monitoring the video data and the audio data for synchronized playback based on the arrival time difference.

The above description is only an example embodiment of the present disclosure and an explanation of the technical principles used. Those skilled in the art should understand that the scope of the disclosure involved in this disclosure is not limited to technical solutions formed by specific combinations of the above technical features, but should also cover other technical solutions formed by any combination of the above technical features or their equivalent features without departing from the above disclosure concept. For example, technical solutions formed by replacing the above features with (but not limited to) technical features with similar functions disclosed in this disclosure.

In addition, although various operations are depicted in a specific order, this should not be understood as requiring these operations to be performed in the specific order shown or in sequential order. In certain environments, multitasking and parallel processing may be advantageous. Similarly, although several specific implementation details are included in the above discussion, these should not be construed as limiting the scope of the present disclosure. Certain features described in the context of individual embodiments can also be implemented in combination in a single embodiment. Conversely, multiple features described in the context of a single embodiment can also be implemented in multiple embodiments separately or in any suitable sub combination.

We claim:

1. A method for audio and video synchronization monitoring, wherein the method is applied to a data push streaming end and comprises:

collecting audio data and video data to be pushed for streaming, and encoding the audio data and video data;

selecting a video reference frame from the video data and adding supplemental enhancement information during an encoding process of the video reference frame, wherein the supplemental enhancement information comprises reference information for synchronized playback of the audio data and video data; and pushing the encoded audio data and video data into a target content distribution network for the data pull streaming end pulls the audio data and video data by a third-party server, and monitoring the audio data and the video data based on the supplemental enhancement information to achieve the synchronized playback, wherein the adding supplemental enhancement information during an encoding process of the video reference frame comprises:

determining an audio reference frame corresponding to the video reference frame; and adding, as the supplemental enhancement information, a signature of the audio reference frame, an audio frame length, an audio data sampling rate and audio frame rendering time, a video data sampling rate of the video reference frame, and a video frame rendering time into encoded data of the reference video frame.

2. A method for audio and video synchronization monitoring, wherein the method is applied to a data pull streaming end and comprises:

pulling audio data and video data to be played, and obtaining supplemental enhancement information of a video reference frame in the video data;

determining, based on the supplemental enhancement information, a rendering time of a video frame in the video data and a rendering time of an audio frame in the audio data; and monitoring the video data and the audio data for synchronized playback based on the rendering time of the video frame in the video data and the rendering time of the audio frame in the audio data, wherein the video data comprises a plurality of video frames, the audio data comprises a plurality of audio frames, and the determining a rendering time of a video frame in the video data and a rendering time of an audio frame in the audio data based on the supplemental enhancement information comprises:

determining a corresponding audio reference frame that matches the video reference frame based on an audio reference frame signature and an audio frame length in the supplemental enhancement information;

determining an audio frame rendering time of each audio frame in the audio data based on an audio data sampling rate and an audio frame rendering time of the audio reference frame in the supplemental enhancement information, and a sending timestamp of each audio frame in the audio data; and determining a video frame rendering time of each video frame in the video data based on a video data sampling rate and a video frame rendering time of the video reference frame in the supplemental enhancement information, and a sending timestamp of each video frame in the video data.

3. The method of claim 2, wherein the determining a video frame rendering time of each video frame in the video data based on a video data sampling rate and a video frame rendering time of the video reference frame in the supplemental enhancement information, and a sending timestamp of each video frame in the video data comprises:

calculating, for each video frame in the video data, a first time difference between a sending timestamp of the each video frame and the video reference frame;

determining a first rendering time difference between the each video frame and the video reference frame based on the first time difference and the video data sampling rate; and determining the video frame rendering time of each video frame by adding the first rendering time difference and the video frame rendering time of the video reference frame.

4. The method of claim 3, wherein the determining an audio frame rendering time of each audio frame in the audio data based on an audio data sampling rate and an audio frame rendering time of the audio reference frame in the supplemental enhancement information, and a sending timestamp of each audio frame in the audio data comprises:

calculating, for each audio frame in the audio data, a second time difference between a sending timestamp of the each audio frame and the audio reference frame;

determining a second rendering time difference between the each audio frame and the audio reference frame based on the second time difference and the audio data sampling rate; and determining the video frame rendering time of the each audio frame by adding the second rendering time difference and the video frame rendering time of the audio reference frame.

5. The method of claim 2, wherein the monitoring the video data and the audio data for synchronized playback based on the rendering time of the video frame in the video data and the rendering time of the audio frame in the audio data comprises:

determining an arrival time difference of the video data relative to the audio data based on a video rendering time of a latest video frame in the video data and an arrival timestamp of the video data, and an audio frame rendering time of a latest audio frame in the audio data and an arrival timestamp of the audio data; and monitoring the video data and the audio data for synchronized playback based on the arrival time difference.

6. An electronic device comprising:

one or more processors; and a storage apparatus configured to store one or more programs, the one or more programs, when executed by the one or more processors, causing the one or more processors to implement a method of audio and video synchronization monitoring which is applied to a data pull streaming end, comprising:

pulling audio data and video data to be played, and obtaining supplemental enhancement information of a video reference frame in the video data;

determining, based on the supplemental enhancement information, a rendering time of a video frame in the video data and a rendering time of an audio frame in the audio data; and monitoring the video data and the audio data for synchronized playback based on the rendering time of the video frame in the video data and the rendering time of the audio frame in the audio data, wherein the video data comprises a plurality of video frames, the audio data comprises a plurality of audio frames, and the determining a rendering time of a video frame in the video data and a rendering time of an audio frame in the audio data based on the supplemental enhancement information comprises:

determining a corresponding audio reference frame that matches the video reference frame based on an audio reference frame signature and an audio frame length in the supplemental enhancement information;

determining an audio frame rendering time of each audio frame in the audio data based on an audio data sampling rate and an audio frame rendering time of the audio reference frame in the supplemental enhancement information, and a sending timestamp of each audio frame in the audio data; and determining a video frame rendering time of each video frame in the video data based on a video data sampling rate and a video frame rendering time of the video reference frame in the supplemental enhancement information, and a sending timestamp of each video frame in the video data.

7. The electronic device of claim 6, wherein the determining a video frame rendering time of each video frame in the video data based on a video data sampling rate and a video frame rendering time of the video reference frame in the supplemental enhancement information, and a sending timestamp of each video frame in the video data comprises:

calculating, for each video frame in the video data, a first time difference between a sending timestamp of the each video frame and the video reference frame;

determining a first rendering time difference between the each video frame and the video reference frame based on the first time difference and the video data sampling rate; and determining the video frame rendering time of each video frame by adding the first rendering time difference and the video frame rendering time of the video reference frame.

8. The electronic device of claim 6, wherein the determining an audio frame rendering time of each audio frame in the audio data based on an audio data sampling rate and an audio frame rendering time of the audio reference frame in the supplemental enhancement information, and a sending timestamp of each audio frame in the audio data comprises:

calculating, for each audio frame in the audio data, a second time difference between a sending timestamp of the each audio frame and the audio reference frame;

determining a second rendering time difference between the each audio frame and the audio reference frame based on the second time difference and the audio data sampling rate; and determining the video frame rendering time of the each audio frame by adding the second rendering time difference and the video frame rendering time of the audio reference frame.

9. The electronic device of claim 6, wherein the monitoring the video data and the audio data for synchronized playback based on the rendering time of the video frame in the video data and the rendering time of the audio frame in the audio data comprises:

determining an arrival time difference of the video data relative to the audio data based on a video rendering time of a latest video frame in the video data and an arrival timestamp of the video data, and an audio frame rendering time of a latest audio frame in the audio data and an arrival timestamp of the audio data; and monitoring the video data and the audio data for synchronized playback based on the arrival time difference.

* * * * *